(12) United States Patent
Anderson et al.

(10) Patent No.: US 7,356,619 B2
(45) Date of Patent: Apr. 8, 2008

(54) METHOD AND APPARATUS FOR DYNAMIC MANAGEMENT OF INPUT/OUTPUT SUBSYSTEM ADDRESSING

(75) Inventors: Gary Dean Anderson, Austin, TX (US); Richard Jamie Knight, Cedar Park, TX (US); Jayeshkumar M. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 10/142,606

(22) Filed: May 9, 2002

(65) Prior Publication Data
US 2003/0212823 A1 Nov. 13, 2003

(51) Int. Cl.
*G06F 3/00* (2006.01)
*G06F 13/00* (2006.01)
(52) U.S. Cl. .............................. 710/8; 710/104; 714/25
(58) Field of Classification Search .............. 710/8–10, 710/104, 302; 711/4, 114, 156; 370/457; 379/230; 707/200, 205; 714/25
See application file for complete search history.

(56) References Cited

U.S. PATENT DOCUMENTS

| | | | | |
|---|---|---|---|---|
| 5,038,320 A | * | 8/1991 | Heath et al. | 710/10 |
| 5,109,500 A | * | 4/1992 | Iseki et al. | 710/74 |
| 5,446,869 A | * | 8/1995 | Padgett et al. | 703/27 |
| 5,581,787 A | * | 12/1996 | Saeki et al. | 710/9 |
| 5,768,277 A | * | 6/1998 | Ohno et al. | 370/457 |
| 6,098,117 A | * | 8/2000 | Foote et al. | 710/8 |
| 6,201,862 B1 | * | 3/2001 | Mercouroff et al. | 379/230 |
| 6,243,773 B1 | * | 6/2001 | Mahalingam | 710/302 |
| 6,314,482 B1 | * | 11/2001 | Chu et al. | 710/104 |
| 6,813,674 B1 | * | 11/2004 | Velasco et al. | 710/311 |

\* cited by examiner

*Primary Examiner*—Christopher Shin
(74) *Attorney, Agent, or Firm*—Duke W. Yee; Diana R. Gerhardt; Theodore D. Fay, III

(57) ABSTRACT

A method, apparatus, and computer instructions for managing a set of I/O subsystems. Previously stored I/O subsystem information is compared to current I/O subsystem information collected from the set of I/O subsystems. The I/O subsystem information includes addresses associated with unique identifiers. Information in the set of subsystems is recorrelated if a mismatch is present between the previously stored I/O subsystem information and the current I/O subsystem information in the set of subsystems.

22 Claims, 4 Drawing Sheets

TO FIG. 1B

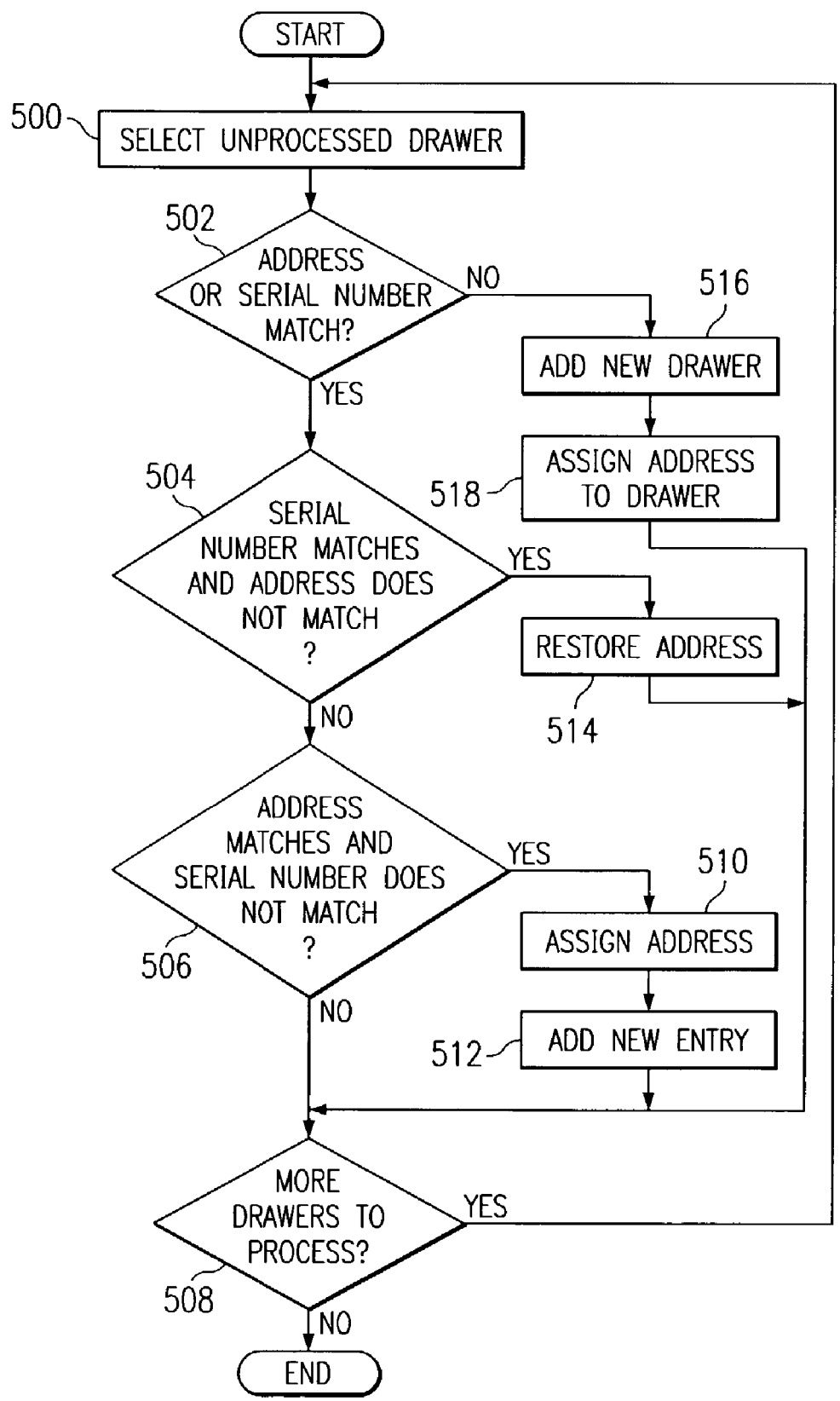

METHOD AND APPARATUS FOR DYNAMIC MANAGEMENT OF INPUT/OUTPUT SUBSYSTEM ADDRESSING

BACKGROUND OF THE INVENTION

1. Technical Field

The present invention relates generally to an improved data processing system, and in particular, to a method and apparatus for managing addressing of components. Still more particularly, the present invention provides a method and apparatus for dynamically managing the addressing of input/output subsystems in a data processing system.

2. Description of Related Art

Data processing systems include many types of components. For example, a typical data processing system includes a processor, a power supply, memory, and peripheral devices. Multiprocessor systems are becoming more common. A multiprocessor data processing system is a data processing system that contains multiple central processing units. This type of system allows for logical partitioning in which a single multiprocessor data processing system may run as if the system were two or more independent systems. In such a system, each logical partition represents a division of resources in the system and operates as an independent logical system. Each of these partitions is logical because the division of resources may be physical or virtual. For example, a multiprocessor data processing system may be partitioned into multiple independent servers, in which each partition has its own processors, main storage, and input/output devices.

Many systems include multiple input/output subsystems in which each subsystem includes a bridge or some other interface to connect the subsystem with other portions of the data processing system through a primary or main input/output hub. Each of these I/O subsystems is also referred to as a "drawer". Each of these drawers or I/O subsystems may include peripheral components, such as, for example, hard disk drives, tape drives, or graphics adapters.

With the use of input/output subsystems or drawers, errors may occur in a particular drawer. Currently, identification of the location of a drawer depends on the physical cabling in the data processing system. Movement of a drawer from one location to another or the removal or addition of a drawer may make identification of a failure or error in a drawer difficult to find, absent relying on the physical cabling.

Therefore, it would be advantageous to have an improved method, apparatus, and computer instructions for managing the addressing of input/output subsystems without relying on the physical cabling.

SUMMARY OF THE INVENTION

The present invention provides a method, apparatus, and computer instructions for managing a set of I/O subsystems. Previously stored I/O subsystem information is compared to current I/O subsystem information collected from the set of I/O subsystems. The I/O subsystem information includes addresses associated with unique identifiers. Information in the set of subsystems is recorrelated if a mismatch is present between the previously stored I/O subsystem information and the current I/O subsystem information in the set of subsystems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for recorrelating I/O subsystems in accordance with a preferred embodiment of the present invention;

DETAILED DESCRIPTION OF THE PREFERRED EMBODIMENT

Figure 1A:
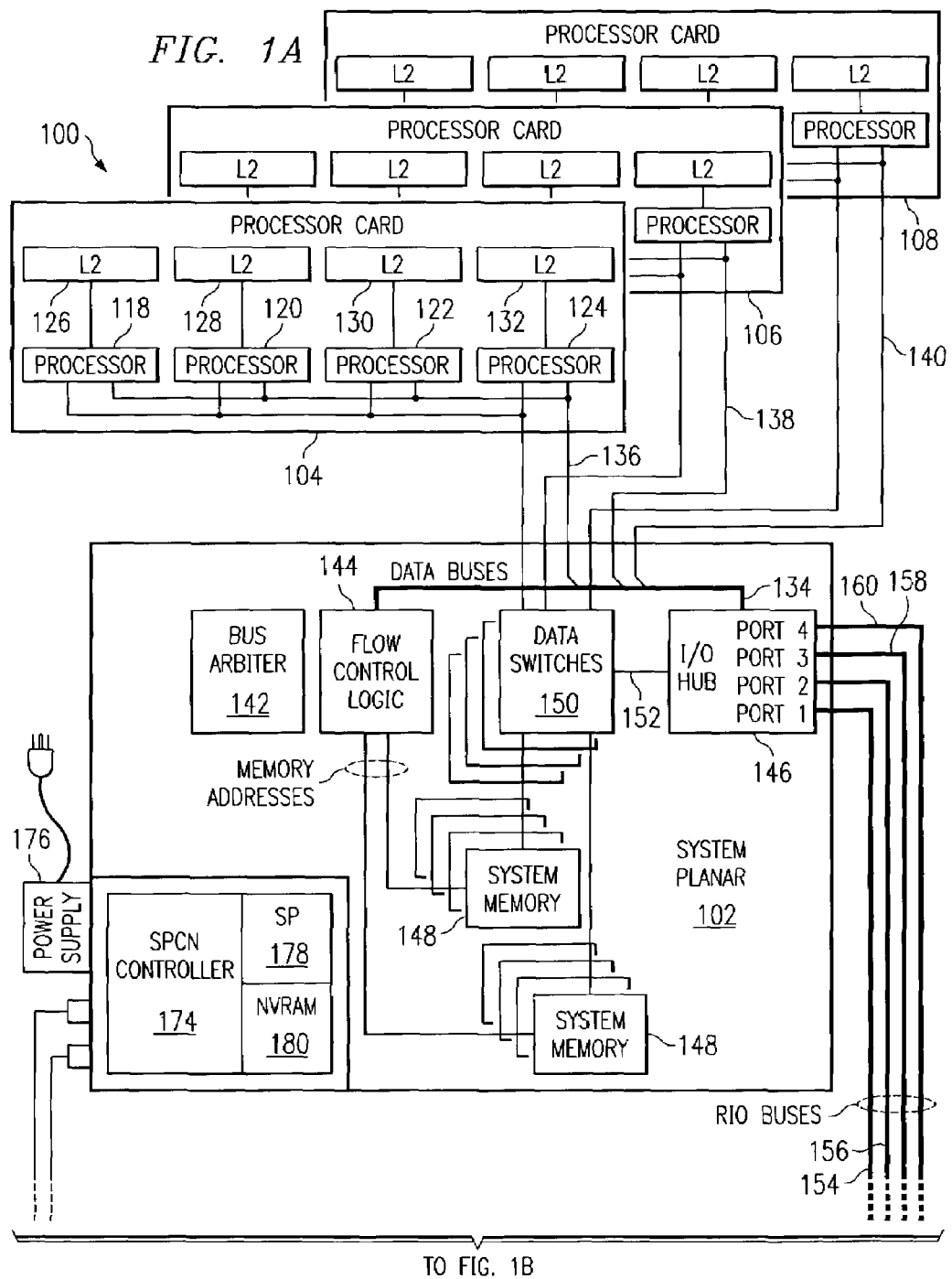
FIGS. 1A and 1B depict a block diagram of an illustrative embodiment of a data processing system with which the present invention may be implemented.
Figure 1B:
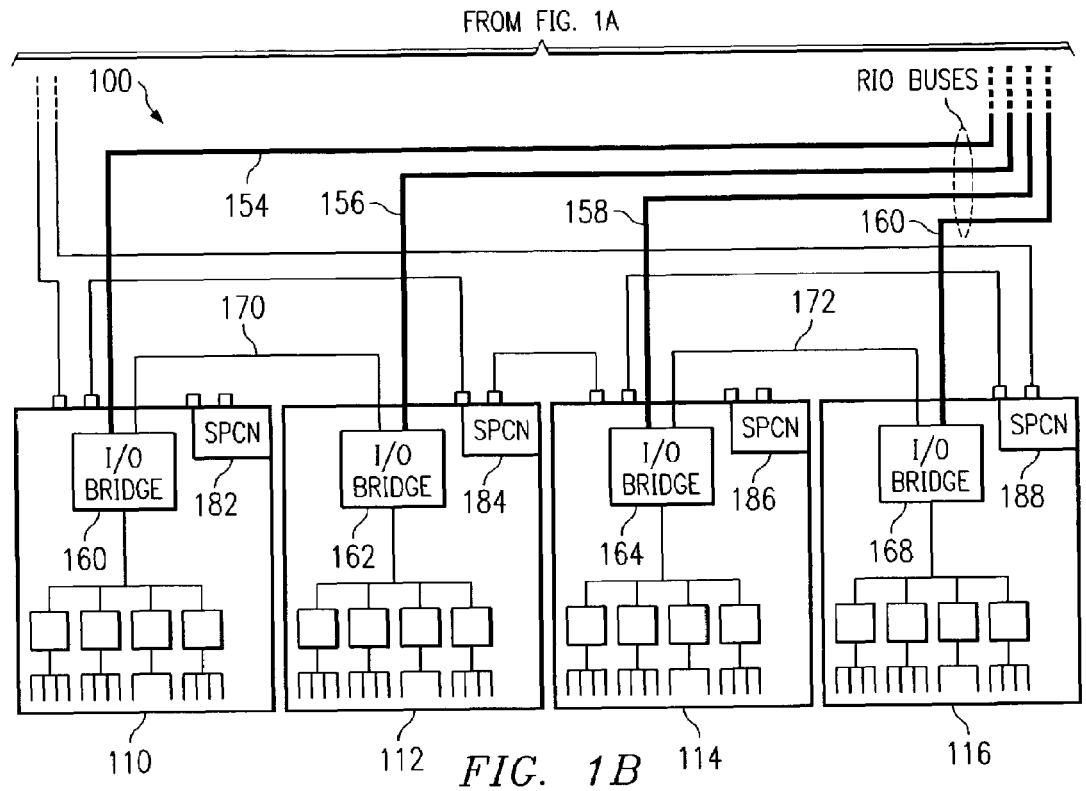

With reference now to the figures and in particular with reference to FIGS. 1A and 1B, there is depicted a block diagram of an illustrative embodiment of a data processing system with which the present invention may be implemented. The illustrative embodiment depicted in FIGS. 1A and 1B is a workstation or server computer system; however, as will become apparent from the following description, the present invention may also be applied to any other data processing system.

As illustrated in FIGS. 1A and 1B, data processing system 100 includes a system planar 102 coupled to one or more processor cards (in this case, processor cards 104, 106 and 108) and one or more input/output (I/O) drawers (in this case, I/O drawers 110, 112, 114, and 116). In the depicted embodiment, processor card 104 includes four general purpose processors, processors 118, 120, 122, and 124, that each have an on-chip level one (L1) cache (not illustrated) and an associated level two (L2) cache, such as L2 caches 126, 128, 130, and 132. Processors 118, 120, 122, and 124, on processor card 104 are all connected to address and control bus 134 and to an associated one of data buses 136, 138, and 140.

As illustrated, system planar 102 includes bus arbiter 142 that regulates access to address and control bus 134 by processors 118, 120, 122, and 124, as well as flow control logic 144 and input/output (I/O) hub 146, which are each connected to address and control bus 134. Flow control logic 144 is further connected to dual-ported system memory 148 and data switches 150, and I/O hub 146 is further connected to data switches 150 by data bus 152 and to each of I/O drawers 110, 112, 114, and 116 by a respective one of primary remote I/O (RIO) buses 154, 156, 158, and 160. Address transactions issued on address and control bus 134 are received by both flow control logic 144 and I/O hub 146. If an address transaction specifies an address associated with a location in system memory 148, flow control logic 144 forwards the address to system memory 148 as an access request. Alternatively, if the address transaction specifies a memory mapped I/O address associated with an I/O device contained in one of I/O drawers 110, 112, 114, or 116, I/O hub 146 routes the address transaction to the appropriate I/O drawer via its primary RIO bus. Flow control logic 144 also supplies control signals to data switches 150 to control the flow of data transactions between processor cards 104, 106, and 108, system memory 148, and I/O hub 146.

Referring now to I/O drawers 110, 112, 114, and 116, each I/O drawer contains an I/O bridge, such as I/O bridge 160, 162, 164, and 168, that is directly connected to I/O hub 146 by a respective primary RIO bus and is coupled either directly or indirectly to I/O hub 146 via a secondary RIO bus, such as secondary RIO bus 170 or secondary RIO bus 172. In other words, in the depicted embodiments of data processing system 100 in which only a single I/O drawer is installed, the I/O bridge is directly connected to I/O hub 146 by both a primary RIO bus and a secondary RIO bus. In other embodiments in which multiple I/O drawers, such as I/O drawers 110, 112, 114, and 116, are installed, each I/O drawer is connected to I/O hub 146 by a single primary RIO bus, such as primary RIO bus 154, 156, 158, or 160, and is connected to another I/O drawer through a secondary RIO bus, such as secondary RIO bus 170 or 172. Thus, I/O hub 146 has redundant paths through which it can communicate to each installed I/O drawer. In these examples, each I/0 bridge is connected to up to four peripheral component interconnect (PCI) bus controllers, which each supply connections for up to four PCI devices. As shown in FIG. 1B, examples of PCI devices that may be attached to PCI controllers of I/O drawers 110, 112, 114, and 116, include, for example, small computer system interface (SCSI) adapters, local area network (LAN) adapters, and hard disk drives.

As shown, data processing system 100 also includes system power control network (SPCN) controller 174, which receives input power from external power supply 176 and, following power on, distributes operating power to all the components of data processing system 100. As illustrated, the system power control network includes redundant connections to I/O drawers 110, 112, 114, and 116, which are interconnected in a loop configuration in order to assure uninterrupted power to I/O devices installed in I/O drawers 110, 112, 114, and 116. Thus, as long as one of the two power connections for an I/O drawer is present, I/O devices in that I/O drawer will receive power.

Data processing system 100 also includes a service processor 178 and nonvolatile random access memory (NVRAM) 180. These components are used in dynamic management of I/O subsystem addressing for the present invention. In addition, each of the I/O drawers includes a SPCN, such as SPCNs 182, 184, 186, and 188. These SPCNs in the drawers store identification information, such as serial number, type, and model for the drawer. The mechanism of the present invention uses this information stored in each of these drawers to compare this stored information with information stored in NVRAM 180. Of course, this information may be stored in any sort of nonvolatile memory, in addition to, or in place of NVRAM 180.

The information stored in NVRAM 180 includes information obtained from I/O drawers 110, 112, 114, and 116, as detected at some previous time. The mechanism of the present invention uses this comparison to detect whether a drawer present in data processing system 100 is a new drawer and whether to assign a unique address to that drawer. By keeping the address of each drawer unique and unchanged, maintaining a previously detected device list under the same I/O drawer is possible. Further, with this type of addressing, dynamic I/O subsystem expansion or change may occur without user intervention or the need for rescanning of the devices on reboot after adding a new input/output subsystem.

Further, the present invention does not depend on system cabling to maintain address ranges as in currently available systems. A particular drawer may be moved within a system and maintain or retain the same address. In these examples, the addresses are virtual addresses.

The mechanism of the present invention also allows for a history of previously assigned addresses for drawers to be maintained. Identification information for each drawer is associated with a unique address. When a new drawer is added, a list may be searched for current and previous addresses. If an address, which has not been used, is encountered, this address is used for the new drawer. If a drawer is removed from the system, the address assigned to this drawer remains in the list and is marked as currently unavailable. If a new unused address is unavailable, one of the old addresses that is currently unused may be reused at that time. In these examples, the identification information used to correlate a virtual address to a physical component is the serial number of the drawer or subsystem. Of course, additional information, such as type and model, also may be used as part of the identification information associated with an address.

Figure 2:
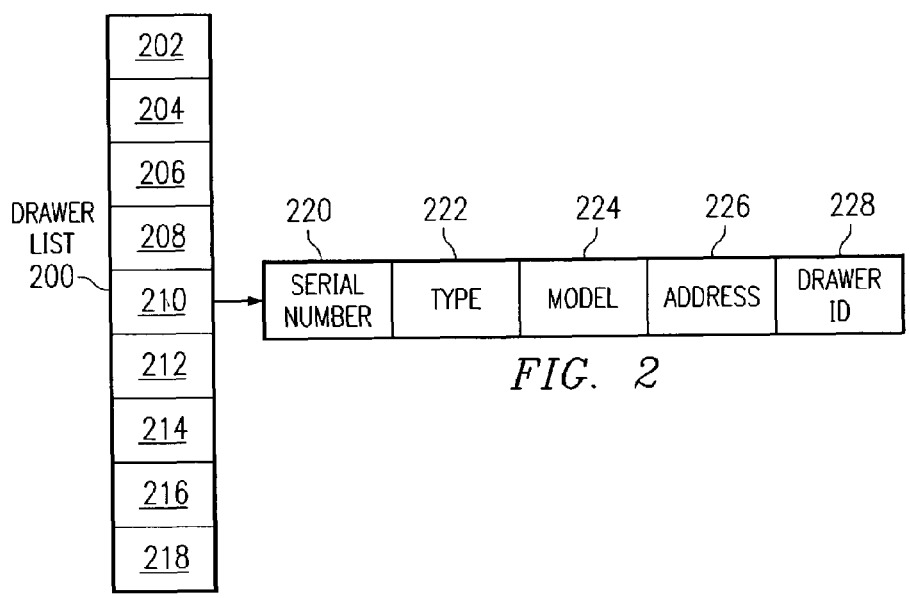
FIG. 2 is a diagram illustrating a drawer list in accordance with a preferred embodiment of the present invention.

With reference now to FIG. 2, a diagram illustrating a drawer list is depicted in accordance with a preferred embodiment of the present invention. Drawer list 200 is an example of a drawer list, which may be stored in NVRAM 180 in FIG. 1A. In this example, drawer list 200 includes entries 202, 204, 206, 208, 210, 212, 214, 216, and 218. Although nine entries are illustrated in this example, other numbers of entries, such as thirty-two, may be used in drawer list 200 depending on the particular implementation. In this example, each drawer list includes identification information as well as an address. For example, entry 202 includes serial number 220, type 222, model 224, address 226, and drawer ID 228. Serial number 220 alone, or in combination with type 222 and model 224, may be associated with address 226. These three pieces of information may form a unique identifier for the particular drawer. This information is retrieved from the SPCN in the drawer. Alternatively, serial number 220 alone may be used as the unique identifier for the drawer. Drawer ID 228 represents an identifier that may be returned if an error is received at address 226, which is a virtual address in these examples. Address 226 also is stored in the drawer having serial number 220. This address is returned in the event an error occurs in a particular drawer and may be used to locate the drawer. For example, when address 226 is returned as part of an error, this address may be used to identify serial number 220 or drawer ID 228. Either of these identifications may be used to determine the physical location of the drawer. Address 226 is a drawer address that is known to the primary SPCN, SPCN controller 174, as well as the secondary SPCNs, SPCNs 182, 184, 186, and 188. This drawer information is used by service processor 178 for communication between SPCNs 182, 184, 186, and 188 and service processor 178. A separate list or database, not shown, may be used to correlate the particular drawer in which an error has occurred for purposes of locating the drawer. In other words, drawer ID 228 may be used as an index to generate a signal, such as a flashing light in a drawer, in response to receiving an error associated with address 226. In this manner, reliance on tracing physical cables from a port is no longer required.

Figure 3:
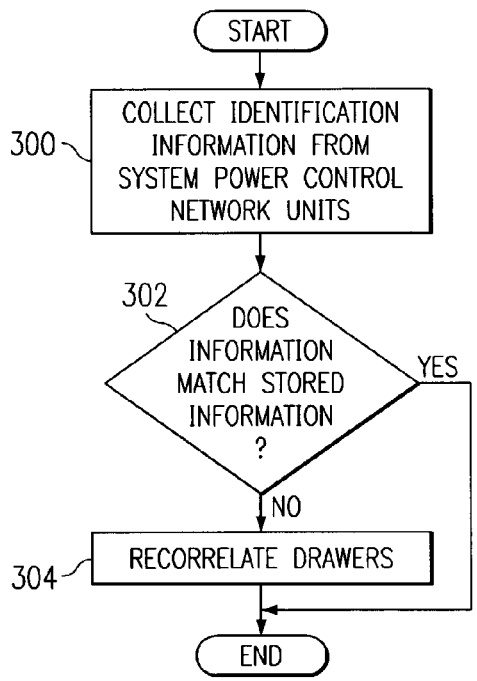
FIG. 3 is a flowchart of a process used for determining whether address information for drawers needs to be updated in accordance with a preferred embodiment of the present invention.

With reference now to FIG. 3, a flowchart of a process used for determining whether address information for drawers needs to be updated is depicted in accordance with a preferred embodiment of the present invention. The process illustrated in FIG. 3 may be implemented in a service processor, such as service processor (SP) 178 in FIG. 1A. This process is typically initiated when a system is powered up or during each power cycle.

The process begins by collecting identification information from system power control network units (step 300). Service processor 178 collects information about each drawer, including type, model, and serial number data, as well as address information from the SPCN in the drawer. Next, a determination is made as to whether the information collected from the drawers matches the stored information stored in a nonvolatile memory, such as NVRAM 180 in FIG. 1A (step 302). If the information does not match the stored information, the drawers are recorrelated (step 304), with the process terminating thereafter.

Returning to step 302, if the information does match the stored information, the process terminates.

Figure 4:
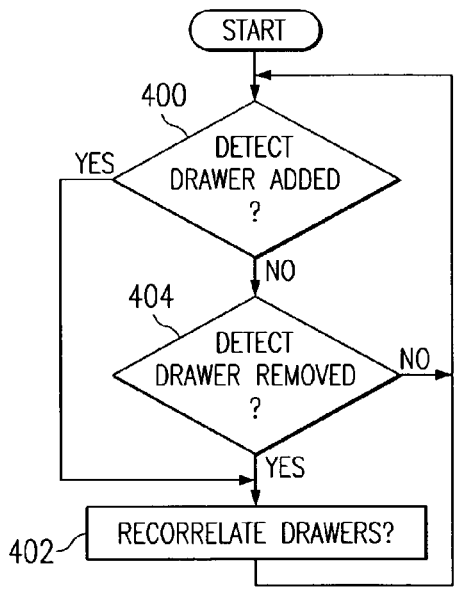
FIG. 4 is a flowchart of a process used for managing addressing for I/O subsystems when components are changed in accordance with a preferred embodiment of the present invention.

Turning now to FIG. 4, a flowchart of a process used for managing addressing for I/O subsystems when components are changed is depicted in accordance with a preferred embodiment of the present invention. The process illustrated in FIG. 4 may be implemented in a service processor, such as service processor 178 in FIG. 1A.

The process begins by detecting whether a drawer has been added (step 400). If a drawer has been added, the drawers are recorrelated (step 402) and the process returns to step 400.

Returning to step 400, if a detection is made that another drawer has not been added, a determination is made as to whether a drawer has been removed (step 404). If a drawer has been removed the process returns to step 402 as described above. Otherwise, the process returns to step 400.

With reference now to FIG. 5, a flowchart of a process used for recorrelating I/O subsystems is depicted in accordance with a preferred embodiment of the present invention. The process illustrated in FIG. 5 may be implemented in a service processor, such as service processor 178 in FIG. 1A. The I/O subsystems are referred to as drawers.

The process begins by selecting an unprocessed drawer (step 500). The determinations described below are comparisons of a serial number and an address obtained from a SPCN in a drawer with a serial number and an address associated with a serial number in a drawer list, such as drawer list 200 in FIG. 2. Next, a determination is made as to whether the address or the serial number match (step 502). Step 502 is performed to determine whether a new drawer has been added to the data processing system. If either the address or serial number matches, a determination is made as to whether the serial number matches and the address does not match (step 504).

Absent a determination that the serial number matches and the address does not match, a determination is made as to whether the address matches and the serial number does not match (step 506). Absent a determination that the address matches and the serial number does not match, a determination is made as to whether there are more drawers to process (step 508). If no more drawers are present to process, the process terminates.

Returning again to step 508, if more drawers are present to be processed, the process returns to step 500. With reference again to step 506, if the address matches and the serial number does not match, an address is assigned (step 510). A positive or yes response to this determination means that the drawer may have been used in this data processing system because the address in the drawer matches an address in the drawer list. Most likely, the number of entries was exceeded and the address was reassigned and the previous entry for this drawer was deleted. As a result, the drawer is assigned the next available address. In this case, the drawer is treated as a new drawer, and a new entry is added (step 512) and the process proceeds to step 508, as described above.

Referring again to step 504, if the serial number matches and the address does not match, the address is restored (step 514) and the process proceeds to step 508, as described above. A mismatch indicates that the drawer is "known" to this system and should have its drawer address restored. Restoring the drawer address allows the configuration or adapter address ranges held within the OS to remain intact. It is possible that the drawer has been temporarily installed in another system and had a new drawer address assigned by that system.

With reference again to step 502, if neither the address or the serial number match, a new drawer is added (step 516). An address is assigned to the drawer (step 518) and the process returns to step 508.

Figure 6:
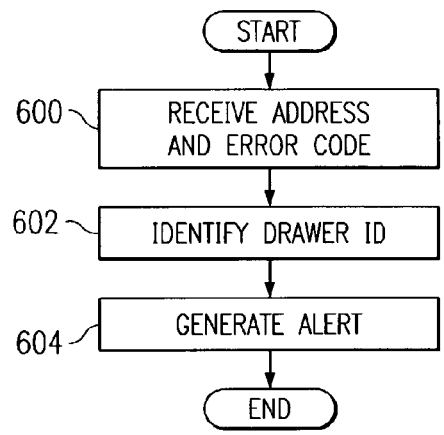
FIG. 6 is a flowchart of a process used to handle an error received from a drawer in accordance with a preferred embodiment of the present invention.

Turning next to FIG. 6, a flowchart of a process used to handle an error received from a drawer is depicted in accordance with a preferred embodiment of the present invention. The process illustrated in FIG. 6 may be implemented in a data processing system, such as data processing system 100 in FIGS. 1A and 1B. When an error occurs, the drawer in which the error originates will return an address, such as address 226, in FIG. 2.

The process begins by receiving an address and an error code (step 600). The address is used to identify the drawer ID (step 602). This identification may be made by using the address as an index into a drawer list, such as drawer list 200 in FIG. 2. Based on this identification of the drawer ID, an alert is generated (step 604), with the process terminating thereafter. This alert may be, for example, a message display in the data processing system or on some console in communication with the data processing system. In addition, the alert may include activation of some signaling mechanism to indicate the location of the drawer. For example, a flashing light may be initiated in the drawer in which the error occurred.

Figure 7:
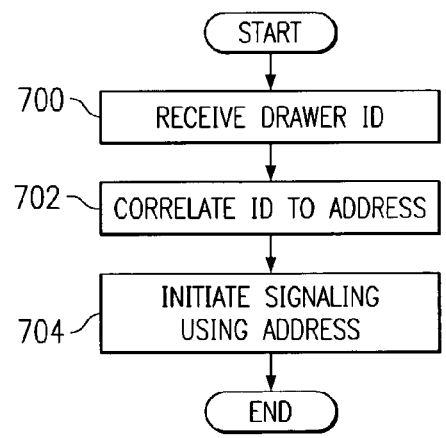
FIG. 7 is a flowchart of a process used for identifying a drawer in response to some error in accordance with a preferred embodiment of the present invention.

With reference now to FIG. 7, a flowchart of a process used for identifying a drawer in response to some error is depicted in accordance with a preferred embodiment of the present invention. The process illustrated in FIG. 7 may be implemented in a data processing system, such as data processing system 100 in FIGS. 1A and 1B. The identification of the drawer is initiated through the correlation of the drawer ID to some address or port for the drawer. The drawer ID may be used as an index or key to a list or database containing an identification of the physical location of the drawer. Alternatively, the serial number of the drawer may be used as an index or key to identify a physical location of the drawer.

The process begins by receiving a drawer ID (step 700). The ID is correlated to the address (step 702). An address assigned to the drawer may be used to send a message to the drawer to initiate the appropriate signal. The address is used in communication with the drawer, and therefore is part of the message sent on the network to initiate the drawer identification. Signaling is initiated using the address (step 704), with the process terminating thereafter. In these examples, the signaling may be, a flashing light or some other visual or audio indicator associated with the drawer that can be used to locate the drawer's physical location.

Thus, the present invention provides an improved method, apparatus, and computer instructions for addressing subsystems with a mechanism that does not depend on physical system cabling to maintain memory address ranges. This mechanism allows an I/O subsystem or drawer to be moved within the same system and maintain the same virtual address.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrated embodiments are described with respect to input/output subsystems. The present invention may be applied to other types of subsystems within a data processing system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a set of subsystems, the method comprising the data processing system implemented steps of:
   comparing stored subsystem information to subsystem information in the set of subsystems, wherein the stored subsystem information includes addresses associated with unique composite identifiers and the subsystem information in the set of subsystems includes addresses associated with unique composite identifiers; and
   recorrelating information in the set of subsystems if a mismatch is present between the stored subsystem information and the subsystem information in the set of subsystems.

2. The method of claim 1, wherein the recorrelating step includes:
   responsive to the absence of a match between both the address and the unique composite identifier in the stored subsystem information and information for a subsystem within the set of subsystems, including a new entry in the stored subsystem information for the subsystem in which an unused address is assigned to the subsystem.

3. The method of claim 1, wherein the recorrelating step includes:
   responsive to a match between a unique identifier in the stored subsystem information and a unique composite identifier stored in a subsystem within the set of subsystems and an absence of a match between an address associated with the unique composite identifier in the stored subsystem information and an address stored in the subsystem, updating the address stored in the subsystem with the address associated with the unique number in the stored subsystem information.

4. The method of claim 1, wherein the recorrelating step includes:
   responsive to a match between an address in the stored subsystem information and an address stored in a subsystem within the set of subsystems and an absence of a match between a unique composite identifier associated with the address in the stored subsystem information and a unique composite identifier stored in the subsystem, updating the address stored in association with the unique composite identifier and the address stored in the subsystem with an available address.

5. The method of claim 1, wherein the wherein the recorrelating step includes:
   responsive to a match between a unique composite identifier in the stored subsystem information and a unique composite identifier stored in a subsystem within the set of subsystems and a match between an address associated with the unique composite identifier in the stored subsystem information and an address stored in the subsystem, leaving the unique composite identifier in the stored subsystem information, the unique composite identifier stored in a subsystem within the set of subsystems, the address associated with the unique composite identifier in the stored subsystem information, and the address stored in the subsystem unchanged.

6. The method of claim 1, wherein the subsystem is an input/output subsystem.

7. The method of claim 1, wherein the stored subsystem information and the subsystem information stored in the set of subsystems further include model numbers.

8. The method of claim 1, wherein the unique composite identifiers include serial numbers.

9. The method of claim 1 further comprising:
   initiating the recorrelating step if a subsystem is added or removed while an operating system is running.

10. The method of claim 1, wherein the stored subsystem information is stored in a nonvolatile random access memory.

11. The method of claim 1, wherein the subsystem information stored in a subsystem is stored in a system power control network unit.

12. The method of claim 1 further comprising:
   prior to comparing stored subsystem information to subsystem information in the set of subsystems, interrogating the set of subsystems for subsystem information in the set of subsystems.

13. The method of claim 1, wherein the stored subsystem information includes information for prior subsystems absent from the set of subsystems.

14. The method of claim 1, wherein the set of subsystems is a set of input/output subsystems.

15. A method in a data processing system for managing a plurality of input/output subsystems, the method comprising:
   responsive to an event, comparing stored identification information for the plurality of input/output subsystems with identification information located in the plurality of input/output subsystems, wherein the identification information includes an address and a unique composite identifier for each input/output subsystem in the plurality of input/output subsystems; and responsive to a mismatch between stored identification information for the plurality of input/output subsystems and identification information located in the plurality of input/output subsystems, selectively updating identification information in at least one of the stored identification information and the identification information located in the plurality of input/output subsystems to form updated identification information, wherein the updated identification information is used to locate an input/output subsystem.

16. The method of claim 15, wherein the selectively updating step includes:

responsive to a presence of a new input/output subsystem being present in the plurality of input/output subsystems, adding identification information for the new input/output subsystem by assigning the new input/output subsystem an available address in association with an assigned unique composite identifier.

17. The method of claim 16, wherein a new input/output subsystem is present if a match between a unique composite identifier for a particular input/output subsystem and a unique composite identifier in stored identification information for the plurality of input/output subsystems is absent.

18. The method of claim 15, wherein the unique composite identifier includes a serial number.

19. The method of claim 18, wherein the unique composite identifier further includes at least one of a model and a type for a input/output subsystem.

20. The method of claim 15, wherein the selectively updating step comprises:

responsive to a match between a unique composite identifier in the stored identification information and a unique composite identifier stored in a selected input/output subsystem in the plurality of input/output subsystems and an absence of a match between an address associated with the unique composite identifier in the stored identification information and an address stored in a selected input/output subsystem, updating the address stored in the selected input/output subsystem to match the address associated with the unique composite identifier.

21. The method of claim 15, wherein the selectively updating step includes:

responsive to a presence of a new input/output subsystem being present in the plurality of input/output subsystems, adding identification information for the new input/output subsystem by assigning the new input/output subsystem an available address in association with an assigned unique composite identifier.

22. The method of claim 15, wherein the plurality of input/output subsystems are a plurality of drawers in the data processing system.

* * * * *